United States Patent [19]

Lin

[11] Patent Number: 5,672,431
[45] Date of Patent: Sep. 30, 1997

[54] EPOXY RESINS INCORPORATED WITH IMIDAZOLE/CHROMIUM ACETYLACETONATE AND COMPOSITES THEREOF

[75] Inventor: King-Fu Lin, Taipei Hsien, Taiwan

[73] Assignee: National Science Council, Taipei, Taiwan

[21] Appl. No.: 603,557

[22] Filed: Feb. 21, 1996

[51] Int. Cl.[6] .......................... C08G 59/40; C08G 59/70
[52] U.S. Cl. ........................ 428/413; 528/92; 528/94; 528/407; 525/523; 525/423; 523/466; 523/468
[58] Field of Search .................... 428/413; 528/92, 528/94, 407

[56] References Cited

U.S. PATENT DOCUMENTS

| | | | |
|---|---|---|---|
| 3,755,253 | 8/1973 | Rice | 528/109 |
| 4,510,277 | 4/1985 | St. Clair et al. | 523/454 |

OTHER PUBLICATIONS

Lin, et al., "Imidazole and Chromium Acetylacetonate as Additives for the Cure and Fracture Toughness of Epoxy Resins and Their Composites", Polymer Composites, Aug. 1995, vol. 16, No. 4, pp. 269–275.

*Primary Examiner*—Frederick Krass
*Attorney, Agent, or Firm*—Cushman Darby & Cushman IP Group of Pillsbury Madison & Sutro LLP

[57] ABSTRACT

The present invention provides a curable epoxy resin composition, which includes an epoxy resin; from 10 to 60 percent by weight of the epoxy resin of an amine curing agent; from 0.1 to 5 percent by weight of the epoxy resin of an imidazole accelerator; and from 0.01 to 5 percent by mole of the epoxy resin of chromium acetylacetonate ($Cr(acac)_3$). The resultant cured epoxy resin prepared from the epoxy resin composition of the present invention demonstrates improved fracture toughness. Also, the interlaminar fracture energy of the resultant graphite/epoxy laminate prepared from the cured epoxy resin of the present invention is greater than that of the conventional graphite/epoxy laminate.

31 Claims, No Drawings

EPOXY RESINS INCORPORATED WITH IMIDAZOLE/CHROMIUM ACETYLACETONATE AND COMPOSITES THEREOF

FIELD OF THE INVENTION

The present invention relates to epoxy resins, and more particularly to epoxy resins incorporated with an imidazole accelerator in combination with chromium acetylacetonate (Cr(acac)$_3$).

DESCRIPTION OF THE PRIOR ART

Since epoxy resins offer high adhesive strength, good processability, chemical resistance, electrical insulation and size stability, they are currently being widely used as adhesives and matrices for structural materials and aerospace composite materials. However, one particular drawback associated with highly cross-linked epoxy resin systems is their brittle nature.

An ordinary method for toughening an epoxy resin involves blending a rubber into the epoxy resin. However, when the rubber-blended epoxy resin is used as a composite matrix or adhesive, the space in which the epoxy resin exists is limited (i.e., the content of the epoxy resin is limited), therefore, the growth of the rubber particles is inhibited. As a result, not only can the epoxy resin not effectively be toughened, but also the rubber is dissolved in the epoxy resin, leading to great lowering of the elastic modulus and the softening temperature of the epoxy resin.

Stoakley et al. in U.S. Pat. No. 4,473,674 disclose that the mechanical properties of epoxy resins can be improved by incorporating cobalt acetylacetonate (Co(acac)$_3$). However, Mijovic reports that the toughening effect is within the confidence interval of the mean value of the neat epoxy resin (J. Appl. Polym. Sci., 40, 1337 (1990)).

Several organotransition metal complexes have been tested to determine the toughening effect on epoxy resins by the inventor of the present invention. It has been found that chromium acetylacetonate (Cr(acac)$_3$) shows significant toughening effect on epoxy resins and increases more than three times the fracture toughness of epoxy resins (Polymer, 34, 277 (1993)). It has also been found that Cr(acac)$_3$ has a greater toughening effect on epoxy resins than Co(acac)$_3$, since Cr(acac)$_3$ can interact with the hydroxy groups on the molecular chain of epoxy resins, while Co(acac)$_3$ can not (Polymer, 34, 2162 (1993)).

SUMMARY OF THE INVENTION

Therefore, it is an object of the present invention to provide a novel epoxy resin formulation. By incorporating an imidazole accelerator in combination with Cr(acac)$_3$, the fracture toughness of the cured epoxy resin can be enhanced. When the novel cured epoxy resin is used as a composite matrix, for example, for preparing a graphite/epoxy (Gr/Ep) laminate, the toughening effect can be transferred to the interlaminar fracture toughness of the resultant composite. Also, the interlaminar fracture energy of the resultant Gr/Ep laminate of the present invention is much higher than that of the conventional Gr/Ep laminate.

To achieve the above object, the novel epoxy resin formulation of the present invention, which is a curable epoxy resin composition, comprises:

an epoxy resin;
from 10 to 60 percent by weight of the epoxy resin of an amine curing agent;
from 0.1 to 5 percent by weight of the epoxy resin of an imidazole accelerator; and
from 0.01 to 5 percent by mole of the epoxy resin of chromium acetylacetonate (Cr(acac)$_3$).

DETAILED DESCRIPTION OF THE INVENTION

The curable epoxy resin composition of the present invention includes an epoxy resin; from 10 to 60 percent by weight of the epoxy resin of an amine curing agent; from 0.1 to 5 percent by weight of the epoxy resin of an imidazole accelerator; and from 0.01 to 5 percent by mole of the epoxy resin of chromium acetylacetonate (Cr(acac)$_3$).

The epoxy resin suitable for use in the present invention can be a two functional epoxy resin, three functional epoxy resin, four functional (also referred to herein as tetrafunctional) epoxy resin or polyfunctional epoxy resin. A four functional epoxy resin is preferable. A representative example of a four functional epoxy resin is N,N,N',N'-tetraglycidyl diamino diphenyl methane (TGDDM). The amine curing agent suitable for use in the present invention includes an aromatic amine curing agent or aliphatic amine curing agent. A frequently used aromatic amine curing agent is, for example, 4,4'-diaminodiphenyl sulfone (DDS).

The imidazole curing accelerator suitable for use in the present invention has the formula:

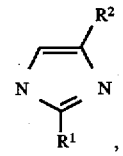

wherein each of R$^1$ and R$^2$ is independently selected from the group consisting of H, alkyl having from 1 to 25 carbon atoms, and phenyl. Representative examples of the imidazole include 2-undecyl imidazole, 2-heptadecyl imidazole and 2-phenyl-4-methylimidazole. The preferred example is 2-undecyl imidazole.

The process for preparing the cured epoxy resin from the curable epoxy resin composition of the present invention includes: (a) providing an epoxy resin; (b) adding from 0.01 to 5 percent by mole of the epoxy resin of Cr(acac)$_3$ to the epoxy resin; (c) adding from 10 to 60 percent by weight of the epoxy resin of an amine curing agent, then adding from 0.1 to 5 percent by weight of the epoxy resin of an imidazole accelerator to the epoxy resin to form a resin mixture; and (d) curing the resin mixture in the 100° C.–200° C. temperature range. Cr(acac)$_3$ can be directly added to the epoxy resin with constant stirring at 50° to 100° C. Alternatively, Cr(acac)$_3$ can be pre-dissolved in a suitable solvent such as methyl ethyl ketone (MEK) or acetone at room temperature, then added to the epoxy resin. Under the latter condition, the solvent should be removed before the epoxy resin is cured.

The epoxy resin formulation of the present invention can be used as a composite matrix and be fabricated to a fiber-reinforced epoxy resin composite material with a fiber-reinforcement material. The suitable fiber-reinforcement material for use in the present invention includes carbon fiber, glass fiber and polyamide fiber (such as Kevlar fiber).

The following examples are intended to demonstrate this invention more fully without limiting its scope, since numerous modifications and variations will be apparent to those skilled in the art.

EXAMPLE 1

The epoxy resin system selected was N,N,N',N'-tetraglycidyl diamino diphenyl methane (TGDDM)/4,4'-diamino diphenyl sulfone (DDS), which is suitable for use as a Gr/Ep (graphite-epoxy) composite matrix. The TGDDM used was Ciba-Geigy's MY 720 resin of which epoxy equivalent weight was determined to be 122.

Three epoxy resin formulations were prepared. The first one was TGDDM/DDS resin, which was prepared by adding 50.8 phr DDS curing agent to the TGDDM resin and stirring at 110° to 120° C. until a clear solution was obtained. The phr is parts per hundred parts of TGDDM by weight.

The second formulation was the TGDDM/DDS epoxy resin incorporated with chromium acetylacetonate (Cr(acac)$_3$). 1 mole % of (Cr(acac)$_3$) was dissolved in TGDDM epoxy resin at 100° C. The (Cr(acac)$_3$)-containing epoxy resin solution was dark purple and could be stored at room temperature for longer than half a year. 50.8 phr DDS curing agent was then added to the (Cr(acac)$_3$)-containing epoxy resin solution and stirred at 110° to 120° C. until a clear solution was obtained. Such an epoxy resin formulation was represented as TGDDM/DDS/(Cr(acac)$_3$).

The process for preparing the third formulation was the same as that for preparing the second, except that after adding DDS, 1 phr 2-undecyl-imidazole ($C_{11}Z$) was subsequently added to the resin solution. Such a resin formulation was represented as TGDDM/DDS/(Cr(acac)$_3$)/$C_{11}Z$.

The above resin formulations were then respectively cast into compact tension specimens, flexural test specimens and dynamic mechanical analysis specimens for mechanical tests. Cured specimens were prepared by the following cure cycle: 2 h at 140° C. plus 2 h at 177° C. plus 4 h at 200° C. for post-cure to obtain maximum glass transition temperature ($T_g$). All specimens after cure were stored in a desiccator at room temperature for at least one week before the mechanical tests were performed. The compact tension specimens were used for fracture toughness which is represented as $G_{Ic}$. The test results are shown in Table 1.

EXAMPLE 2

Compact tension specimens, flexural test specimens and dynamic mechanical analysis specimens of TGDDM/DDS/Cr(acac)$_3$/$C_{17}Z$ were prepared for mechanical tests according to the same method for preparing those of TGDDM/DDS/Cr(acac)$_3$/$C_{11}Z$ as in Example 1, except that 2-undecyl-imidazole ($C_{11}Z$) was replaced by 2-heptadecyl-imidazole ($C_{17}Z$). The test results are shown in Table 1.

EXAMPLE 3

Compact tension specimens, flexural test specimens and dynamic mechanical analysis specimens of TGDDM/DDS/Cr(acac)$_3$/2P4MZ were prepared for mechanical tests according to the same method for preparing those of TGDDM/DDS/Cr(acac)$_3$/$C_{11}Z$ as in Example 1, except that 2-undecyl-imidazole ($C_{11}Z$) was replaced by 2-phenyl-4methylimidazole (2P4MZ). The test results are shown in Table 1.

TABLE 1

The mechanical properties of different epoxy resins.

| Epoxy Resin Formulation | $G_{IC}$ (J/m$^2$) | Flexural modulus ($10^9$ N/m$^2$) | Flexural strength ($10^6$ N/m$^2$) | $T_g$ (°C.) |
|---|---|---|---|---|
| TGDDM/DDS | 108 ± 30.9 | 3.13 ± 0.25 | 116 ± 31.7 | 260 |
| TGDDM/DDS/ Cr(acac)$_3$ | 298 ± 38.0 | 2.78 ± 0.11 | 126 ± 10.7 | 250 |
| TGDDM/DDS/ Cr(acac)$_3$/ $C_{11}Z$ | 369 ± 17.0 | 2.76 ± 0.08 | 81 ± 18.1 | 222 |
| TGDDM/DDS/ Cr(acac)$_3$/ $C_{17}Z$ | 343 ± 100.0 | 2.90 ± 0.22 | 94 ± 20.8 | 240 |
| TGDDM/DDS/ Cr(acac)$_3$/ 2P4MZ | 325 ± 41.1 | 2.98 ± 0.25 | — | 231 |

It is seen from Table 1 that incorporation of Cr(acac)$_3$ plus $C_{11}Z$, or Cr(acac)$_3$ plus $C_{17}Z$, or Cr(acac)$_3$ plus 2P4MZ into TGDDM/DDS epoxy resin increases the fracture toughness more than 3 times compared to the TGDDM/DDS resin, and the other mechanical properties are not significantly affected.

EXAMPLE 4

The TGDDM/DDS, and TGDDM/DDS/Cr(acac)$_3$/$C_{11}Z$ resin solutions used were the same as in Example 1. TGDDM/DDS/$C_{11}Z$ resin solution was prepared by adding 50.8 phr DDS and 1 phr $C_{11}Z$ in sequence and stirring at 110° to 120° C. until a clear solution was obtained. TGDDM/DDS/BF$_3$MEA resin solution was prepared in the same way as for TGDDM/DDS/$C_{11}Z$, except that $C_{11}Z$ was replaced with BF$_3$MEA. BF$_3$MEA (boron trifluoride monoethylamine) is a conventionally used curing accelerator.

Each of the four epoxy resin solutions was coated on a release paper respectively. The coating thickness was controlled within 0.06±0.01 mm. Carbon fibers were impregnated with the coated release paper in a drum-type winding machine. The resin content and fiber areal weight of manufactured prepregs were controlled at 40±2 wt % and 137±1 g/m$^2$ respectively The laminates were laid up according to different requirements for different tests. Then the laminates were packaged in vacuum bag and pressurized, heated and cured in an autoclave. The curing condition was at 140° C. for 2 h plus 177° C. for 2 h, and the air pressure was controlled within 4.1±0.1 kg/cm$^2$.

After removing from the autoclave, the laminates were cut into SBS (short beam shear) test [O]$_{16}$ specimens, three point flexural test [O]$_{16}$ specimens, and DCB (double cantilever beam) fracture test [O]$_{24}$ specimens. All the specimens were post-cured at 200° C. in an oven for 4 hours, then cooled to room temperature, and finally stored in a desiccator for at least one week before the SBS test, three point flexural test, DCB fracture test and resin content test were performed. The resin content was determined by the ASTM D3171-765 matrix decomposition method. The test results are shown in Table 2.

TABLE 2

The resin contents and physical properties of different Gr/Ep unidirectional laminates fabricated from different epoxy resin formulations.

| Epoxy Resin Formulation | Resin content (wt %) | Interlaminar Fracture Energy (J/m$^2$) | SBS strength (10$^6$ N/m$^2$) | Flexural strength (10$^9$ N/m$^2$) | $T_g$ (°C.) |
|---|---|---|---|---|---|
| TGDDM/DDS | 22 | — | 67.7 ± 4.1 | 1.73 ± 0.04 | 280 |
| TGDDM/DDS/ BF$_3$MEA | 29 (33) | 324 ± 7 (270 ± 7) | 70.3 ± 4.0 | 1.36 ± 0.06 | 267 |
| TGDDM/DDS/ C$_{11}$Z | 32 | 406 ± 22 | 77.6 ± 4.4 | 1.21 ± 0.03 | 242 |
| TGDDM/DDS/ Cr(acac)$_3$/ C$_{11}$Z | 33 | 560 ± 22 | 85.5 ± 4.0 | 1.32 ± 0.06 | 238 |

From the data of Table 2, the resin content of the laminate produced from TGDDM/DDS is only 22 wt %. There are many voids and residual stress trapped in the structure, and thus, the physical properties are unstable. As a result, such a laminate is not suitable for commercial use. Incorporation of only Cr(acac)$_3$ can not increase the resin content to an acceptable level. However, incorporation of C$_{11}$Z can increase the resin content from 22 to 32 wt %, which is close to the typical resin content of Gr/Ep laminates. This is due to that the C$_{11}$Z accelerator reacts with TGDDM as early as when the temperature is raised to 140° C., increasing the resin viscosity at the proper moment, thus preventing the excess loss of the resin and increasing the resin content.

Incorporation of both Cr(acac)$_3$ and C$_{11}$ into the TGDDM/DDS resin can increase the resin content of the laminate to 33 wt %, which is close to that of the laminate prepared from TGDDM/DDS/C$_{11}$Z. Moreover, the interlaminar fracture energy of the laminate prepared from TGDDM/DDS/Cr(acac)$_3$/C$_{11}$Z is much higher than that prepared from TGDDM/DDS/C$_{11}$Z.

Due to the fiber bridging effect, the interlaminar fracture energy is dependent on the resin content and is estimated as a 14 J/m$^2$ increment of interlaminar fracture energy per 1 wt % decrease of the resin content. Therefore, a comparison of the interlaminar fracture energy among different resin formulations should be made on laminates containing the same resin content. To compare the interlaminar fracture energy between the laminates prepared from TGDDM/DDS/Cr (acac)$_3$/C$_{11}$Z and TGDDM/DDS/BF$_3$MEA, TGDDM/DDS/ BF$_3$MEA laminate was adjusted to the same resin content (33 wt %) as TGDDM/DDS/Cr(acac)$_3$/C$_{11}$Z laminate, and the interlaminar fracture energy was calculated to be 270±7 J/m$^2$. Therefore, the interlaminar fracture energy of the Gr/Ep composites prepared from the TGDDM/DDS epoxy resin incorporated with Cr(acac)$_3$ and C$_{11}$Z is two times that of the Gr/Ep composites prepared from the typical TGDDM/ DDS/BF$_3$MEA epoxy formulation. The other physical properties of the TGDDM/DDS/Cr(acac)$_3$/C$_{11}$Z laminate are not significantly affected compared to those of conventional TGDDM/DDS/BF$_3$MEA laminates.

What is claimed is:

1. A curable epoxy resin composition, comprising:
   an epoxy resin;
   from 10 to 60 percent by weight of the epoxy resin of an amine curing agent;
   from 0.1 to 5 percent by weight of the epoxy resin of an imidazole accelerator; and
   from 0.01 to 5 percent by mole of the epoxy resin of chromium acetylacetonate (Cr(acac)$_3$), wherein the imidazole accelerator has the formula

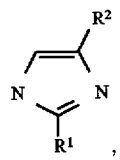

wherein R$^1$ is selected from the group consisting of an alkyl having from 11 to 25 carbon atoms and a phenyl, and R$^2$ is selected from the group consisting of H, an alkyl having from 1 to 25 carbon atoms, and a phenyl.

2. The curable epoxy resin composition as claimed in claim 1, wherein the epoxy resin is a tetrafunctional epoxy resin.

3. The curable epoxy resin composition as claimed in claim 2, wherein the tetrafunctional epoxy resin is N,N,N', N'-tetraglycidyl diamino diphenyl methane (TGDDM).

4. The curable epoxy resin composition as claimed in claim 1, wherein the amine curing agent is an aromatic amine or aliphatic amine.

5. The curable epoxy resin composition as claimed in claim 4, wherein the amine curing agent is an aromatic amine.

6. The curable epoxy resin composition as claimed in claim 5, wherein the aromatic amine is 4,4'-diamino diphenyl sulfone (DDS).

7. The curable epoxy resin composition as claimed in claim 1, wherein R$^1$ is the alkyl having from 11 to 25 carbon atoms, and R$^2$ is the H.

8. The curable epoxy resin composition as claimed in claim 7, wherein the imidazole accelerator is 2-undecylimidazole.

9. The curable epoxy resin composition as claimed in claim 7, wherein the imidazole accelerator is 2-heptadecylimidazole.

10. The curable epoxy resin composition as claimed in claim 8, wherein the imidazole accelerator is 2-phenyl-4-methylimidazole.

11. A curable epoxy resin composite composition, comprising:
    an epoxy resin;
    from 10 to 60 percent by weight of the epoxy resin of an amine curing agent;
    from 0.1 to 5 percent by weight of the epoxy resin of an imidazole accelerator;
    from 0.01 to 5 percent by mole of the epoxy resin of chromium acetylacetonate (Cr(acac)$_3$); and
    a fiber,
    wherein the imidazole accelerator has the formula

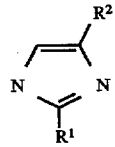

wherein R$^1$ is selected from the group consisting of an alkyl having from 11 to 25 carbon atoms and a phenyl, and R$^2$ is selected from the group consisting of H, an alkyl having from 1 to 25 carbon atoms, and a phenyl.

12. The curable epoxy resin composite composition as claimed in claim 11, wherein the epoxy resin is a tetra functional epoxy resin.

13. The curable epoxy resin composite composition as claimed in claim 12, wherein the tetrafunctional epoxy resin is N, N, N', N'-tetraglycidyl diamino diphenyl methane (TGDDM).

14. The curable epoxy resin composite composition as claimed in claim 11, wherein the amine curing agent is an aromatic amine or aliphatic amine.

15. The curable epoxy resin composite composition as claimed in claim 14, wherein the amine curing agent is an aromatic amine.

16. The curable epoxy resin composite composition as claimed in claim 15, wherein the aromatic amine is 4,4'-diamino diphenyl sulfone (DDS).

17. The curable epoxy resin composite composition as claimed in claim 11, wherein $R^1$ is the alkyl having from 11 to 25 carbon atoms, and $R^2$ is the H.

18. The curable epoxy resin composite composition as claimed in claim 17, wherein the imidazole accelerator is 2-undecyl-imidazole.

19. The curable epoxy resin composite composition as claimed in claim 17, wherein the imidazole accelerator is 2-heptadecyl-imidazole.

20. The curable epoxy resin composite composition as claimed in claim 11, wherein the imidazole accelerator is 2-phenyl-4-methylimidazole.

21. The curable epoxy resin composite composition as claimed in claim 11, wherein the fiber is selected from the group consisting of carbon fiber, glass fiber and polyamide fiber.

22. The curable epoxy resin composite composition as claimed in claim 21, wherein the fiber is carbon fiber.

23. A process for preparing a cured epoxy resin, comprising:
   a) providing an epoxy resin;
   b) adding from 0.01 to 5 percent by mole of the epoxy resin of chromium acetylacetonate to the epoxy resin;
   c) adding from 10 to 60 percent by weight of the epoxy resin of an amine curing agent, then adding from 0.1 to 5 percent by weight of the epoxy resin of an imidazole accelerator to the epoxy resin to form a resin mixture; and
   d) curing the resin mixture at a temperature in a range of from 100° C. to 200° C.,
wherein the imidazole accelerator has the formula

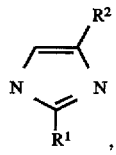

wherein $R^1$ is selected from the group consisting of an alkyl having from 11 to 25 carbon atoms and a phenyl, and $R^2$ is selected from the group consisting of H, an alkyl having from 1 to 25 carbon atoms, and a phenyl.

24. A process for preparing a cured epoxy resin, comprising:
   a) providing an epoxy resin;
   b) adding from 0.01 to 5 percent by mole of the epoxy resin of chromium acetylacetonate to the epoxy resin, and stirring at a temperature in a range of from 50° C. to 100° C. to form a resin pre-solution;
   c) adding from 10 to 60 percent by weight of the epoxy resin of an amine curing agent and then adding from 0.1 to 5 percent by weight of the epoxy resin of an imidazole accelerator to the resin pre-solution to form a resin solution; and
   d) curing the resin solution at a temperature in a range of from 100° C. to 200° C.,
wherein the imidazole accelerator has the formula

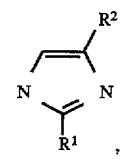

wherein $R^1$ is selected from the group consisting of an alkyl having from 11 to 25 carbon atoms and a phenyl, and $R^2$ is selected from the group consisting of H, an alkyl having from 1 to 25 carbon atoms, and a phenyl.

25. A process for preparing a cured epoxy resin, comprising:
   a) providing an epoxy resin;
   b) dissolving from 0.01 to 5 percent by mole of the epoxy resin of chromium acetylacetonate in a solvent at room temperature to form a chromium acetylacetonate solution;
   c) adding the chromium acetylacetonate solution to the epoxy resin;
   d) removing the solvent;
   e) adding from 10 to 60 percent by weight of the epoxy resin of an amine curing agent, and then adding from 0.1 to 5 percent by weight of the epoxy resin of an imidazole accelerator to the solvent-removed chromium/epoxy resin solution to form a resin mixture; and
   d) curing the resin mixture obtained in step e) at a temperature in a range of from 100° C. to 200° C.,
wherein the imidazole accelerator has the formula

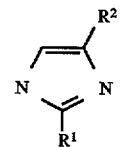

wherein $R^1$ is selected from the group consisting of an alkyl having from 11 to 25 carbon atoms and a phenyl, and $R^2$ is selected from the group consisting of H, an alkyl having from 1 to 25 carbon atoms, and a phenyl.

26. The process for preparing a cured epoxy resin as claimed in claim 25, wherein the solvent is selected from the group consisting of methyl ethyl ketone and acetone.

27. A cured epoxy resin which is produced by the process as claimed in claim 23.

28. A cured epoxy resin which is produced by the process as claimed in claim 24.

29. A cured epoxy resin which is produced by the process as claimed in claim 25.

30. A curable epoxy resin composition, comprising:
   a tetrafunctional epoxy resin;
   from 10 to 60 percent by weight of the epoxy resin of an amine curing agent;

from 0.1 to 5 percent by weight of the epoxy resin of 2-undecyl-imidazole; and from 0.01 to 5 percent by mole of the epoxy resin of chromium acetylacetonate.

31. A curable epoxy resin composite composition, comprising:

a tetrafunctional epoxy resin;

from 10 to 60 percent by weight of the epoxy resin of an amine curing agent;

from 0.1 to 5 percent by weight of the epoxy resin of 2-undecyl-imidazole;

from 0.01 to 5 percent by mole of the epoxy resin of chromium acetylacetonate; and a carbon fiber.

* * * * *